US007133864B2

(12) United States Patent
Roth

(10) Patent No.: US 7,133,864 B2
(45) Date of Patent: Nov. 7, 2006

(54) SYSTEM AND METHOD FOR ACCESSING BIOLOGICAL DATA

(75) Inventor: Chantal Roth, San Diego, CA (US)

(73) Assignee: Syngenta Participations AG, Basel (CH)

( * ) Notice: Subject to any disclaimer, the term of this patent is extended or adjusted under 35 U.S.C. 154(b) by 357 days.

(21) Appl. No.: 09/938,714

(22) Filed: Aug. 23, 2001

(65) Prior Publication Data

US 2003/0041053 A1 Feb. 27, 2003

(51) Int. Cl.
*G06F 17/30* (2006.01)
(52) U.S. Cl. .......................................................... 707/3
(58) Field of Classification Search .................... 707/2, 707/3, 4, 5, 6, 10, 101, 102, 103 R, 201; 704/9; 709/201; 715/501.1
See application file for complete search history.

(56) References Cited

U.S. PATENT DOCUMENTS

| 5,538,897 | A |   | 7/1996  | Yates, III et al. ............... 435/5   |
|-----------|---|---|---------|------------------------------------------|
| 5,832,496 | A | * | 11/1998 | Anand et al. ................ 707/102     |
| 5,993,662 | A |   | 11/1999 | Garr et al. .................... 210/656  |
| 6,017,693 | A |   | 1/2000  | Yates, III et al. ............. 436/89    |
| 6,064,754 | A |   | 5/2000  | Parekh et al. ................ 382/129    |
| 6,147,344 | A |   | 11/2000 | Annis et al. ................. 382/153    |
| 6,360,214 | B1| * | 3/2002  | Ellis et al. ....................... 707/2 |
| 6,539,378 | B1| * | 3/2003  | Gupta et al. ..................... 707/5  |
| 6,697,818 | B1| * | 2/2004  | Li et al. .................. 707/103 R    |

FOREIGN PATENT DOCUMENTS

| WO | WO 99/12040   | 3/1999  |
|----|---------------|---------|
| WO | WO 99/61654 A1| 12/1999 |
| WO | WO 00/11206 A1| 3/2000  |
| WO | WO 00/29987   | 5/2000  |

OTHER PUBLICATIONS

Washburn et al., Large-scale analysis of the yeast proteome by multidimensional protein identification technology, *Nature Biotechnology* 19:242-247 (2001).
Conrads, et al., Quantitative Analysis of Bacterial and Mammalian Proteomes Using a Combination of Cysteine Affinity Tags and $^{15}$N-Metabolic Labeling; *Anal. Chem.* 73:2132-2139 (2001).
Griffin et al., Quantitative Proteomic Analysis Using a MALDI Quadrupole Time-of-Flight Mass Spectrometer; *Anal. Chem.* 73:978-986 (2001).
Gygi, et al., Quantitative analysis of complex protein mixtures using isotope-coded affinity tags; *Nature Biotech* 17:994-999; (1999).
Han et al., Quantitative profiling of differentiation-induced microsomal proteins using isotope-coded affinity tags and mass spectrometry; *Nature Biotech* 19:946-951 (2001).

(Continued)

*Primary Examiner*—Diane Mizrahi
(74) *Attorney, Agent, or Firm*—Jenkins, Wilson, Taylor & Hunt, P.A.

(57) ABSTRACT

A system is presented with a search panel for specifying search criteria for searching a database of biological information. The search panel uses the extensible markup language (XML) to send search requests to the database. A database graph generation module linked to the biological database generates a database graph representing the database schema. Once the database schema is known, another module creates joins between the database tables in order to most effectively join data from one table to another. An SQL statement incorporating the optimized joins is then used to search the biological database.

21 Claims, 7 Drawing Sheets

OTHER PUBLICATIONS

Oda, et al., Accurate quantitation of protein expression and site-specific phosphorylation; *Proc. Natl. Acad. Sci. USA* 96:6591-6596 (1999).

Yao, et al., Proteolytic $^{18}$O Labeling for Comparative Proteomics: Model Studies with Two Serotypes of Adenovirus; *Anal. Chem.* 73:2836-2842 (2001).

* cited by examiner

SYSTEM AND METHOD FOR ACCESSING BIOLOGICAL DATA

BACKGROUND OF THE INVENTION

1. Field of the Invention

The present invention relates to a method, system, and software program for generating a search within a relational database, or across homogenous relational databases. More specifically, the invention relates to a search tool that automatically creates joins between tables without the user or client software having previous knowledge of the database schema.

2. Description of the Prior Art

A structured database is a computerized record keeping system created for the purpose of maintaining information and making that information available on demand. Many databases in use today are based on a relational model, often called a relational database, in which the data is stored as a collection of individual tables all related to one another.

The tables, or nodes in a graphical representation, in a relational database include a row of column names specifying one or more column fields, and one or more data rows containing a single value for each of the column fields. For example, a table containing product information in a company's product database may contain a column of product names, and each field in that column may contain a name of a current product. Similarly, a second column may contain product ID numbers each relating to the product name found within the same row.

One feature that distinguishes relational from nonrelational databases is the ability to "join" two or more tables. A join is described as a query in which data is retrieved from the fields of more than one table (although data may also be retrieved by joining a table with itself). In order to join two or more tables, the tables to be joined need to share a common key field that is stored in at least one column. Typically, the purpose of the join is to connect data having the same primary key across the tables being joined. A primary key is usually represented as a column of data entries in a parent table, while secondary keys, also called foreign keys, describe an identical column of data in a child table to be joined. In such cases, for the results of the join to be meaningful, the columns that represent the same data in the different tables must use the same field values to represent the same instances of those objects. In other words, the primary and foreign keys must use the same text strings in order to effect a correct join.

One common query for retrieving data from various tables in a database is the SELECT statement from the structured query language (SQL). A standard SQL statement usually takes the form: "SELECT <string> FROM <string> WHERE <string> GROUP BY <string> HAVING <string> ORDER BY <string>." More information on SQL can be found at http://www.microsoft.com. While only the SELECT and FROM strings are required, it is desirous to include other strings to further narrow and optimize the search, and to allow the user to express the desired format of results. The result of a SELECT statement is a subset of data that matches the search criteria, and is stored as a temporary table, often termed the result table. In the SELECT statement illustrated above, the FROM string indicates the table name from which the information is being retrieved. The remaining strings included in the SELECT statement direct which columns are to be returned and stored in the results table. The WHERE string includes filtering criteria and hence dictates which rows satisfy the search criteria and are to be returned and stored in the results table.

A join operation is usually performed by specifying more than one table in the FROM string of the SELECT statement. A join operation allows rows from multiple tables all satisfying the search criteria to be sequentially combined into a single row and stored in the results table. This becomes important for grouping relevant information into a single table, rather than requiring the search engine to repeatedly parse the entire database to assemble the requested data, thus saving time.

As an example of a join operation, assume that a first table has columns containing a primary key of product names and product purchase prices. A second table may have a foreign key that contains product names that can be joined to the first table, and additionally has a second column that contains product sales prices. A third table might contain a foreign key column of product names and a second column containing product profit margin numbers. In order to effect a correct join between the three tables, a query would recognize that the column containing product names is identical across the three tables. Furthermore, the text string containing the product names must also be identical across the three tables in order to effect a correct join. Now, when a query is run that requests the financial properties of a particular product, the search can be conducted across the tables in the database by first finding the product name as a text string within each table, and then returning the value of the corresponding financial information. In this example, the product name field is used to join the three tables containing purchase, sales, and profit margin dollar amounts, all of which can be returned to the user initiating the query.

Additionally, not all three tables need share an identical common column as previously demonstrated. For example, suppose a user wants to find if a particular product is currently in stock in a particular color. The first table might contain a list of product names and corresponding product ID numbers. A second table may contain the list of product ID numbers and corresponding product colors. A third table may contain a list of product colors and corresponding quantities in stock. To search for a particular color of the product, the database management software would transverse the tables by starting with the product name, join the product ID number from the first table to the product colors of the second table, and then use the product colors to finally retrieve the quantity in stock from the third table. The path to find if a particular color is in stock then follows the path: product name, product ID number, product color, and finally quantity in stock. It is conceivable that another table might include columns containing product names and colors. Therefore, an alternative path might be: product name, product color, and finally quantity in stock, thus cutting out one node from the path and reducing the time required to perform the search. If this simple example were extended substantially, there could potentially be hundreds or thousands of different paths to follow to get from the starting node to the desired result. As the complexity and amount of the data entries increase, the number of potential paths increases exponentially. This becomes readily apparent where a database system contains a large number of data entries relating to the same primary key entry, such as in a biological database, for example.

Traditional database search methods are able to perform a search across various tables, however, they are grossly inefficient because a chosen path might connect hundreds of nodes when a more efficient path would connect only a few nodes. Hence, in an effort to streamline the query process, it is desirous for a database search tool to automatically create the correct joins and then optimize the joins by calculating the shortest path between two nodes.

One current problem with current database systems is that they usually require an experienced database manager to structure queries based on personal knowledge of the database's schema and contents. Furthermore, a query usually searches for an exact string match, or maybe a partial string with wildcard characters. Even though some database techniques allow the database to store a list of synonyms for a frequently used search term, the list is cumbersome to maintain and is often non-exhaustive.

Typically, the tables within a single database are joined. However, with current database management systems, the tables to be joined need not be contained within the same database. Products such as SQLNet from Microsoft Corporation and SQL Connect from Oracle Corporation enable the use of a heterogeneous database where a collection of database tables on different hardware platforms operating under different database management systems all appear to a user to be on one machine operating under one database management system.

In any case, current database systems require the user to have some knowledge of what fields are searchable within a database to be able to formulate a query that will allow the requested information to be retrieved. If a user is not intimately familiar with the database schema, it can be very inefficient, or even impossible, for a user to find the requested information.

It would be a substantial advancement in the art if the correct joins could be created automatically without the user having any prior knowledge of the database schema. It would be an additional advancement in the art if the correct joins and corresponding paths could be optimized to conduct an efficient search thus reducing the time required for a search. The present invention, among other things, provides a solution to this problem.

More narrowly, one application of relational databases is in the storing of biological information such as gene sequences. Modern biological sequencing efforts, such as those underway for the complete sequencing of the entire human genome, as well as newly developed experimental techniques for biological analysis, have resulted in an unprecedented amount of information contained in publicly accessible databases. For example, GenBank (an annotated database of all published DNA and RNA sequences), SwissProt (an annotated protein sequence database), PubMed (a biomedical literature repository), Molecular Modeling Database (contains 3-dimensional macromolecular structures including nucleotides and proteins), Entrez Genomes (a whole sequence listing for the complete genomes of individual organisms), PopSet (a set of DNA sequences that have been collected to analyze the evolutionary relatedness of a population), and NCBI taxonomy database (containing the names of all organisms that are represented in genetic databases) are some of the publicly accessible databases.

The information and sequence records contained in the public databases are typically accessible using programs or applications collectively referred to as bioinformatic applications. One method of information searching and data acquisition involves the use of specifically designed or proprietary analysis applications which query, retrieve, and interpret information contained in the database directly. These analysis programs may access the informational databases and may contain additional functionality to process, analyze and categorize the information and databases to facilitate their use.

Each publicly accessible database usually provides a non-uniform output, thus requiring a separate bioinformatic application to query each database. Because of the large number of publicly accessible databases, the number of specifically designed or proprietary analysis applications is continually increasing to allow users of such databases to access and analyze the information contained in the databases. This requires a user to purchase and maintain a multitude of applications specifically designed to access each database of interest. This becomes expensive in terms of disk storage, purchase price of such applications, and the time required to learn to use each application. It would be a substantial improvement in the art if a single program product were capable of searching any of the various publicly accessible biological databases as described herein.

Thus, there is a need for an improved design and method of searching and retrieving information from a multitude of relational databases. The system should have the characteristic feature of database independence in order to allow different databases and schemas to be used without having to devote large amounts of time to rewrite the code for existing databases or components and to minimize the changes to existing databases needed to update the system with new functionalities. Furthermore, the system should preserve the property of component reuse, wherein database designers and application programmers may reuse components which are likely to be used by the many different applications accessing the information in the database. Additionally, the database system and applications should be code independent. Thus, whenever a new utility or application is added to the system, or if a component is changed, little or no lines of code will have to be changed in other applications or services improving upgrade performance and reducing maintenance time.

SUMMARY OF THE INVENTION

The present invention discloses a system and method for automatically creating and optimizing the correct joins between tables in a relational database. This is done by first creating a database graph, and then calculating the correct joins between the requested nodes. Finally, the joins are optimized and embedded in the SQL statement to be presented to the database management software thus optimizing the database query.

One embodiment of the invention is a system for searching a database of biological information. The system includes: a server computer comprising a database of biological information and a first module for receiving a structured language query and transferring said query to a search engine; a database graph generation module associated with said search engine configured to generating a database graph; and a joins module configured to create joins between database tables based on said database graph, wherein said server computer runs a structured query language (SQL) search on said database based upon said joins.

Another embodiment of the invention is a computer system for searching a database of biological information, that includes: a database of biological information comprising tables of biological data; a search module configured to receive a structured language query and convert said structured language query into a search statement for querying said database of biological information; and a joins module configured to determine how to join said tables of biological data in order to provide the results of said query.

Yet another embodiment of the invention is a method for querying a relational database. This method includes the steps of: sending a structured language database query to a search engine; parsing the database and creating a database graph; creating the correct joins corresponding to said query; translating said structured database query into an SQL statement incorporating said joins; and sending said SQL statement to a Relational Database.

BRIEF DESCRIPTION OF THE DRAWINGS

These and other features will now be described with reference to the drawings summarized below. These drawings and the associated description are provided to illustrate embodiments of the invention and not to limit the scope of the invention. Throughout the drawings, reference numbers are re-used to indicate correspondence between referenced elements.

DETAILED DESCRIPTION

Figure 1:
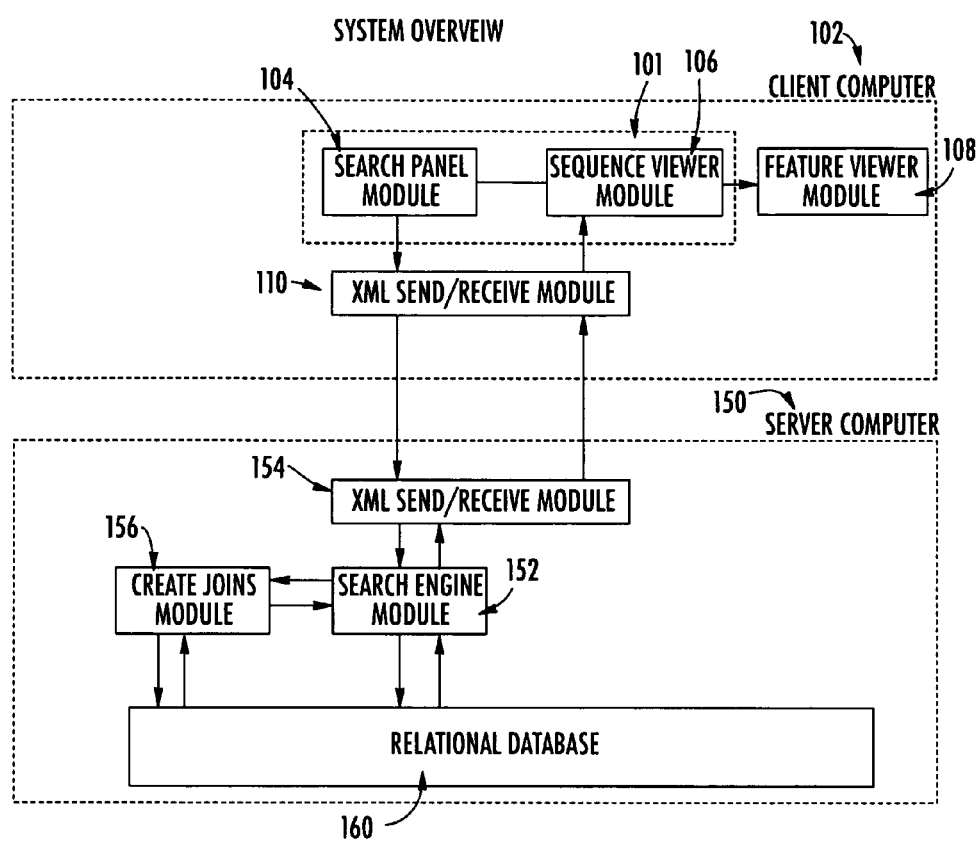
FIG. 1 illustrates several modules of one embodiment of the invention.

The following description, with accompanying drawings, represents specific embodiments and methods for practicing the present invention. It is understood that other embodiments may be implemented without departing from the scope of the present invention. Accordingly, the following description is illustrative and should not be construed as limiting in scope.

The present invention describes a software product that, when executed by a microprocessor, enables a user to search a database without knowing anything about the database's schema. Furthermore, the search is conducted more efficiently than traditional database search engines are capable of because as the tables within the database are joined, the shortest path between nodes is calculated, thus achieving an efficient retrieval of the requested information.

The following detailed description uses several terms specific to the industry. The following list will clearly define those terms as used herein.

A. Instructions

Instructions refer to computer-implemented steps for processing information in the system. Instructions can be implemented in software, firmware or hardware and include any type of programmed step undertaken by components of the system.

B. Local Area Network

One example of the Local Area Network may be a corporate computing network, including access to the Internet, to which computers and computing devices comprising the system are connected. In one embodiment, the LAN conforms to the Transmission Control Protocol/Internet Protocol (TCP/IP) industry standard. In alternative embodiments, the LAN may conform to other network standards, including, but not limited to, the International Standards Organization's Open Systems Interconnection, IBM's SNA, Novell's Netware, and Banyan VINES.

C. Microprocessor

The microprocessor may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. The microprocessor typically has conventional address lines, conventional data lines, and one or more conventional control lines.

D. Modules

The system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

E. Network System

The system may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, an Internet includes network variations such as public internet, a private internet, a secure internet, a private network, a public network, a value-added network, an intranet, and the like.

F. Operating Systems

The system may be used in connection with various operating systems such as: UNIX, Disk Operating System (DOS), OS/2, Windows 3.X, Windows 95, Windows 98, and Windows NT.

G. Programming Languages

The system may be written in any programming language such as C, C++, BASIC, Pascal, Java, and FORTRAN and ran under the well-known operating system. C, C++, BASIC, Pascal, Java, and FORTRAN are industry standard programming languages for which many commercial compilers can be used to create executable code.

H. Transmission Control Protocol

Transmission Control Protocol (TCP) is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP provides protocol ports to distinguish multiple programs executing on a single device by including the destination and source port number with each message. TCP performs functions such as transmission of byte streams, data flow definitions, data acknowledgments, lost or corrupt data re-transmissions and multiplexing multiple connections through a single network connection. Finally, TCP is responsible for encapsulating information into a datagram structure.

1. Description of the System

Reference will now be made to the drawings wherein like numerals refer to like parts throughout.

In reference to FIG. 1, a Client Computer 102, having a microprocessor running an operating system, executes the instructions contained in each of the represented modules. The modules are stored either in either a fixed or removable electronic data storage device such as a hard disk. The modules contain computer instructions that, when executed by a microprocessor in the Client Computer 102, result in the practicing of at least one aspect of the invention disclosed and claimed herein. The following description references a bioinformatic application querying a biological database, but the invention as claimed can be used to query any relational database.

A Search Viewer Module 101 comprises modules that allow a user to specify search criteria and view the results of said query. A Search Panel Module 104 utilizes a graphical user interface (GUI) to present a user with options for searching a Relational Database 160 stored on a Server Computer 150. The Search Panel Module 104 includes instructions that allow the user to filter the data entries within the Relational Database 160 through specifying search criteria such as a gene name, organism type, accession number, or by keyword. A search may also include wildcard characters as is generally known in the art. Thus, an exact string match does not need to be entered in order to retrieve the desired data. One embodiment of a Search Viewer is depicted and described in relation to FIG. 2 below.

In communication with the Search Panel Module 104 is a Sequence Viewer Module 106. When the search results from a user's search criteria are returned, they are displayed in the Sequence Viewer Module 106 and the user is given additional options for selecting, modifying, or retrieving further information. Additionally, the user may invoke a Feature Viewer Module 108 for graphically viewing a sequence of interest. The Feature Viewer Module 108 allows the user to view the features of a sequence, which may range in the hundreds. Because the graphical image of a gene is very complex, the Feature Viewer Module 108 includes instructions for zooming in on individual graphical features, and for scrolling across the graphical display. In addition to the graphical display of a gene sequence, the Feature Viewer Module 108 can display other detailed information about a gene sequence, such as introns, exons, coding sequences, gene predictions, and RNAs. This list is non-exhaustive and the Feature Viewer Module 108 could display any relevant information about a sequence of interest. Likewise, when the present invention is integrated with another type of database, any relevant information about the search result could be displayed to the user within the feature viewer. One embodiment of a Feature Viewer Module is depicted and described in relation to FIG. 3 below.

Once a user specifies the requested search criteria, an XML send/receive Module 110 stored and executed on the Client Computer 102 formats a query in a structured data language, such as XML, and sends the query to an XML send/receive module 154 stored on a Server Computer 150. Described embodiments of the invention disclose modules stored on both a Client Computer 102 and a Server Computer 150. It will be understood by one of ordinary skill in the art that all relevant modules could be stored and executed by a single computer, thus eliminating the need for separate Client and Server Computers. In addition, although an XML send/receive module 154 is described in one embodiment, the invention is not limited to this methodology of data communication. For example, data can be transferred from the client to the server using Enterprise Java Beans (EJB), for instance using a session bean. More information on Java technology can be obtained from Sun Microsystems, Inc. (Palo Alto, Calif.) and on the Internet at http://www.sun.com.

An XML send/receive Module 154 is stored and executed on a Server Computer 150, which receives a query in a structured data language, such as XML, from the XML send/receive Module 110, and then routes that query to a Search Engine Module 152. The Search Engine Module 152 is in communication with a Create Joins Module 156 which executes instructions that direct it to parse the database schema and creates the correct joins between the appropriate tables. This becomes increasingly important in creating an efficient database query as the data stored in a database increases. As an example of the amount of data stored in current biological databases, GenBank, the publicly accessible national nucleotide sequence database, contained over 11,101,000,000 bases in 10,106,000 sequence records as of December 2000. The ability to create efficient searches of databases of this size becomes imperative to efficiently retrieving relevant data.

The Create Joins Module 156 further calculates the shortest path between the nodes of interest. The shortest path is calculated using a recursive algorithm, such as:

$$\text{path}(\text{node}_n, \text{node}_m) = \text{path}(\text{node}_{n-1}, \text{node}_m) + \text{edge}(\text{node}_n, \text{node}_{n-1})$$

where $\text{node}_{n-1}$ depicts a neighboring node of n, and path means the shortest path between n and m. This function continues until $\text{node}_{n-1} = \text{node}_m$.

There are potentially hundreds of thousands of possible different paths between two nodes. The most efficient path might link only five tables, while a less efficient path might link dozens of tables together in one SQL statement. Thus, it becomes essential to be able to conduct an efficient search for requested information. The Create Joins Module 156 then returns the optimized joins to the Search Engine Module 152, which formulates a proper SQL statement based upon the search criteria and created joins and transmits the query to the Relational Database 160, as is generally known in the art. The Relational Database 160 returns the results to the Search Engine Module 152, which translates the results into a structured data language, such as XML, and sends the XML results to the XML send/receive Module 154. The results are then sent to the XML send/receive Module 110 of the Client Computer 102, which delivers the results to the user via the Sequence Viewer Module 106.

Thus, it will be appreciated by one of ordinary skill in the art that a Client Computer can query a relational database remotely, including over the internet using internet protocols such as TCP and internet languages stemming from the standard generalized markup language (SGML). The present invention utilizes XML as the preferred structured data language for several reasons. XML is a meta-language and a subset of SGML typically used to represent structured data in an application in a platform-independent manner. The XML specification possesses a number of properties which improve the data conversion routines used by the XML send/receive modules 154, 110 and ensure that future upgrades and additions to the system are easily transitioned through.

Furthermore, the XML language specification is platform-independent and may be used with any computer system which has an XML interpreter. Thus, data exchange between computers or devices sending data output to the XML send/receive modules 110, 154, need not be identical thereby improving the flexibility of the system to provide cross-platform formatting and organization of data. Additionally, the use of XML improves the ability to separate the content of the data output from its representation by parsing the data output into flexibly designated. Furthermore, the use of XML facilitates database-independent searches. Without being limited by the specific database schema or its management software, the system is able to search any type of database, programmed in any language, without changing the software code that constructs the joins and creates the SQL statements.

Finally, because all returned data results can be translated into an XML format, numerous external applications that conform to the XML specification can be added to the system for viewing, manipulating, or sending the search results without substantially changing the modules disclosed herein. For a review of the XML specification the reader is directed to Inside XML, by Steven Holzner, New Riders Publishing, 2000.

However, XML is not the only structured data language that could be used in practicing the current invention. For example, Java, JavaScript, or cgi scripts could be implemented to conduct database searches over a network without departing from the scope of the present invention.

Figure 2:
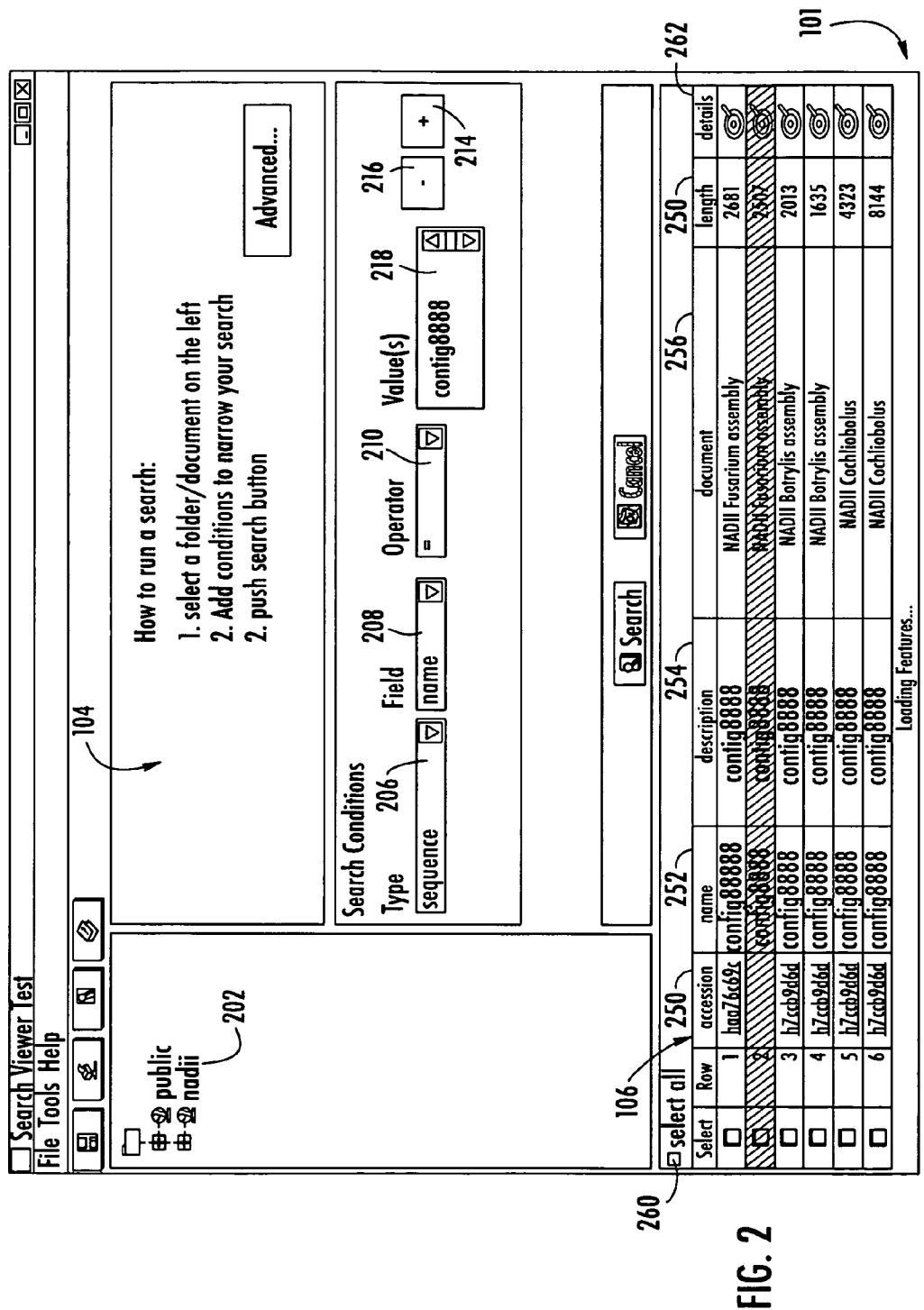
FIG. 2 illustrates one embodiment of a Search Viewer Module.

FIG. 2 depicts one embodiment of the Search Viewer Module 101 comprising the Search Panel module 104 and the Sequence Viewer module 106. The Search Panel Module 104 includes a plurality of fields that enable a user to specify search criteria for effectively searching a biological database. For example, a Search Panel Database Selector 202 provides an entry field that allows a user to specify a specific database, folder, or a plurality of databases or folders for conducting the query. Additionally, the Search Panel Database Selector 202 can be used to specify a publicly accessible, and relational, database available via the Internet as has been described herein. The Search Panel Module 104 presents a plurality of drop down boxes with available selections. The first set of drop down boxes, the Type Box 206, allows the user to select a high-level indicator of the type of search to be performed. For example, a user may select to search based on a keyword, sequence, or specific sequence feature.

The next column of drop down boxes, the Field Box 208, allows the user to enter more specific criteria about the object selected in the Type Box 206. For example, if the Type Box 206 has selected "sequence", the Field Box 208 will have various selections available such as "sequence_length", "sequence_name", "sequence_accession_number", or other information specific to a sequence.

The third column of boxes, the Operator Box 210, allows the user to specify a comparative search of the database data. For example, the most common type of search will include the "=" symbol to designate that the search results should exactly match the criteria. Additional Operators can include the greater than sign ">", the less than sign "<", "starts with", "ends with", "contains". Finally, a Values Box 218 is available for the user to enter the specific characteristic of the sequence of interest. The entire row of search conditions that includes a Type Box 206, Field Box 208, Operator Box 210, and a Values Box 218, makes up a completed search row.

As an example, the search row exemplified in FIG. 2 includes the Type Box 206 having "sequence" as the active selection. The database data is then narrowly filtered along the search row to search for a sequence, having a "name" equal to "contig8888." Only the results matching the specific search criteria are returned. In this embodiment, each of the search lines is incorporated into the query and the results returned have characteristics that satisfy all the specified search criteria.

There is also an Expand Button 214 and a Retract Button 216 that allow the user to increase or decrease the number of search lines presented to the user. The available selections in the Type Box 206 are populated by including high-level elements found within a specific database. In an application for searching biological databases, the Type Box 206 selections may be populated with standard search terms relating to the information normally entered into a biological database. For other types of database searches, the Type Box 206 selections can be populated by changing a few lines of program code. Similarly, the Field Box 208 selections are also populated by incorporating general characteristics of sequences that are likely to be included in a biological database.

The selections in the Field Box 208 can be changed to reflect the fields that are likely searchable within any type of database by changing an XML file that stores the data displayed in the field box. The ability to alter an associated XML file, without needing to recompile the program code allows the Search Viewer Module 101 to search any type of database and allows the system to be highly flexible and scalable with respect to the various databases available. Additionally, this feature allows this module to be used with any type of relational database, and is thus not restricted to only providing searches within biological databases.

In addition to the Search Panel Module, 104, the Search Viewer Module 101 additionally includes the Sequence Viewer Module 106. The Sequence Viewer Module 106 is activated upon the search results being returned to the Search Viewer Module 101 from the XML send/receive Module. In one aspect, the relevant information relating to a gene sequence is displayed and the user is allowed to select certain sequences of interest. The returned data is organized into rows containing information to allow a user to select one or more sequences to further view or modify. Accordingly, information such as accession number 250, sequence name 252, sequence description 254, document retrieved from 256, and sequence length 258 is presented to give the user enough information to determine if a particular sequence is worth further study. It should be realized that the actual data presented to the user once a sequence has been selected can be customized for each user.

It will be apparent to one of ordinary skill in the art that this collection of returned information is not the only information that could be returned to the user. Additionally, this returned information can be altered through the modification of a few lines of code in the associated XML file, which again adds to the flexibility and scalability of the present invention to be used in conjunction with any relational database. As in generally known in the software art, a Select All Check Box 260 is provided to allow a user to select all the returned sequences without having to individually check each of the returned results. This saves a user a considerable amount of time given the fact that hundreds or thousands of results could be returned that match the search criteria.

Likewise, checking the Select All Check Box 260 a second time will deselect all the returned results. Once a user selects the sequences of interest, a Details Button 262 is provided that, when clicked, launches a predetermined module that is specified in an associated XML file. In one embodiment, the Details Button 262 launches a Feature Viewer Module to present a graphical representation of the sequence and will be more fully discussed in conjunction with FIG. 3.

Figure 3:
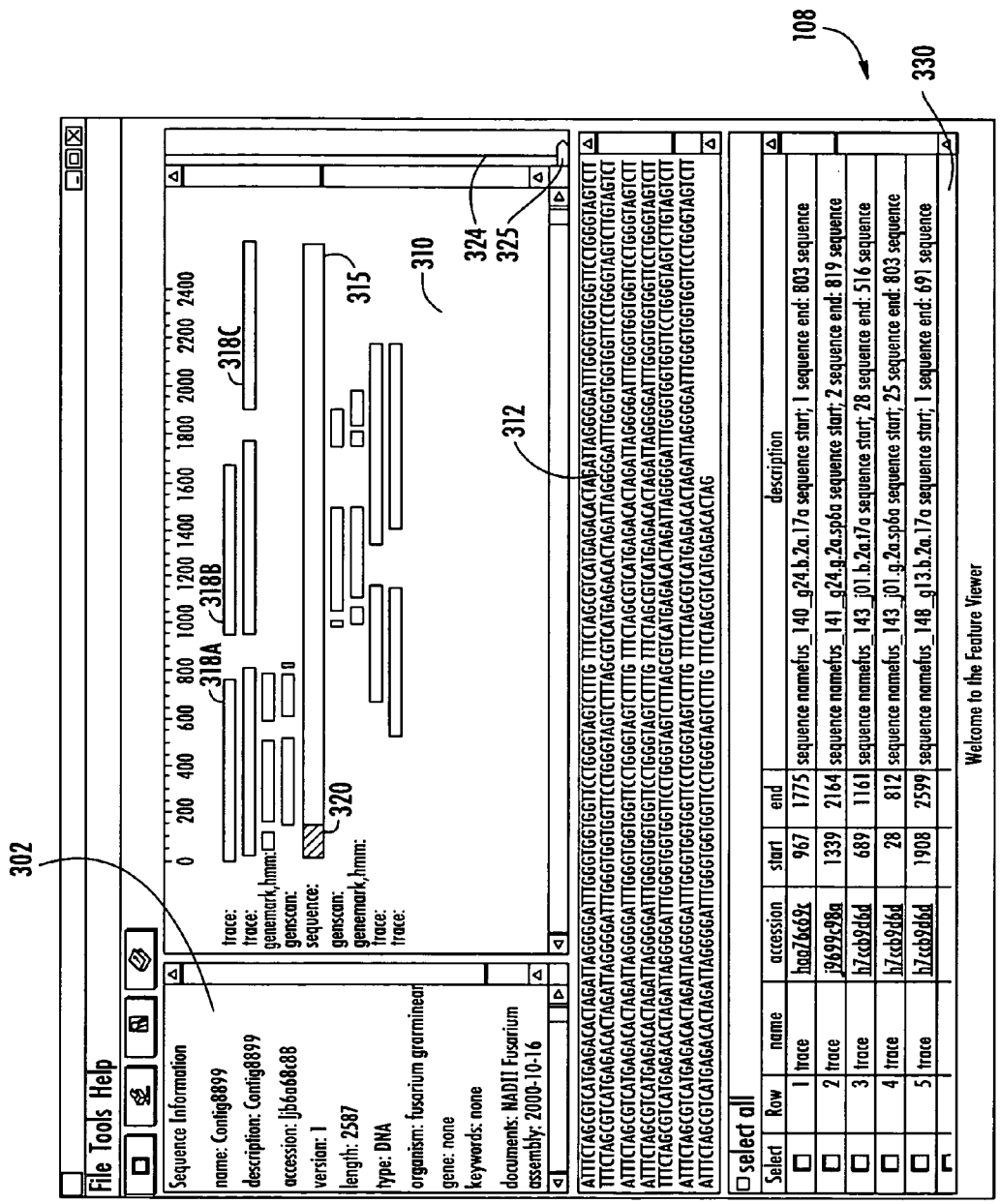
FIG. 3 illustrates one embodiment of a Feature Viewer Module.

Turning now to FIG. 3 wherein the Feature Viewer Module 108 is more fully described. In one aspect, the Feature Viewer Module provides both a graphical window 310 and a textual window 312 to illustrate the sequence and its features. A Sequence Information Column 302 repeats some of the data depicted in the Sequence Viewer Module. Specifically, the sequence name, description, accession number, and length are repeated to adequately describe the chosen sequence. Additionally, other fields may be present to convey further information such as organism type, and corresponding gene.

The feature viewer module 108 also includes the graphical sequence window 310 that graphically illustrates each of the sequences that have been returned from the prior search. For example, the sequence window 310 graphically depicts a full length sequence 315, and several sequence fragments 318A–C. Each sequence is shown as a colored bar within the sequence window 310.

Each colored bar within the sequence window 310 includes variously colored segments corresponding to various features of the sequence. For example, sequence 315 includes a colored segment 320 which corresponds to one feature of the sequence 315. If a user wishes to see the details of the feature corresponding to colored segment 320, they can place the mouse cursor over the colored segment to view a pop-up box that provides details of the feature. Accordingly, the graphical sequence 315 includes a series of software controls that are triggered in response to a "mouse over" event. As is known, a "mouse over" event is triggered whenever the mouse cursor is placed on top of a control that has been programmed to detect this type of event.

The feature viewer module 108 also includes a slider control 324 that is used to zoom in on a predetermined sequence. Thus, moving the slider knob 325 upwards within the control 324 will zoom in on a predetermined sequence so that a user can view the features or sequence in more detail. In one example, if the slider knob 325 is moved all the way to the top of the control 324, the window 310 will show the actual nucleotide or amino acid sequence of the selected sequence so that the user will know which sequences correspond to a particular feature.

In another embodiment, the color of the nucleotide or amino acid letters depicted when the slider knob 325 is moved to zoom in on the sequence relates to the quality of the sequence. Thus, nucleotides that have been sequenced with low quality might be shown in white letters, whereas sequences that are known to be of high quality (eg: reliability) are shown in black letters. Of course, the choice of alternate colors is envisioned, so this embodiment of the invention is not limited to any particular color set.

Below the feature window 310 is the textual window 312 which lists the actual sequence of the sequences selected in the graphical window 310. Additionally, if a particular feature is chosen within the graphical window 310, its sequence is highlighted in the textual window 312. This provides the user with both graphical and textural information on a particular sequence or feature.

Below the textural window 312 is a sequence listing window 330 that provides a brief list of each sequence listed in the graphical window 310 and its features.

Figure 4:
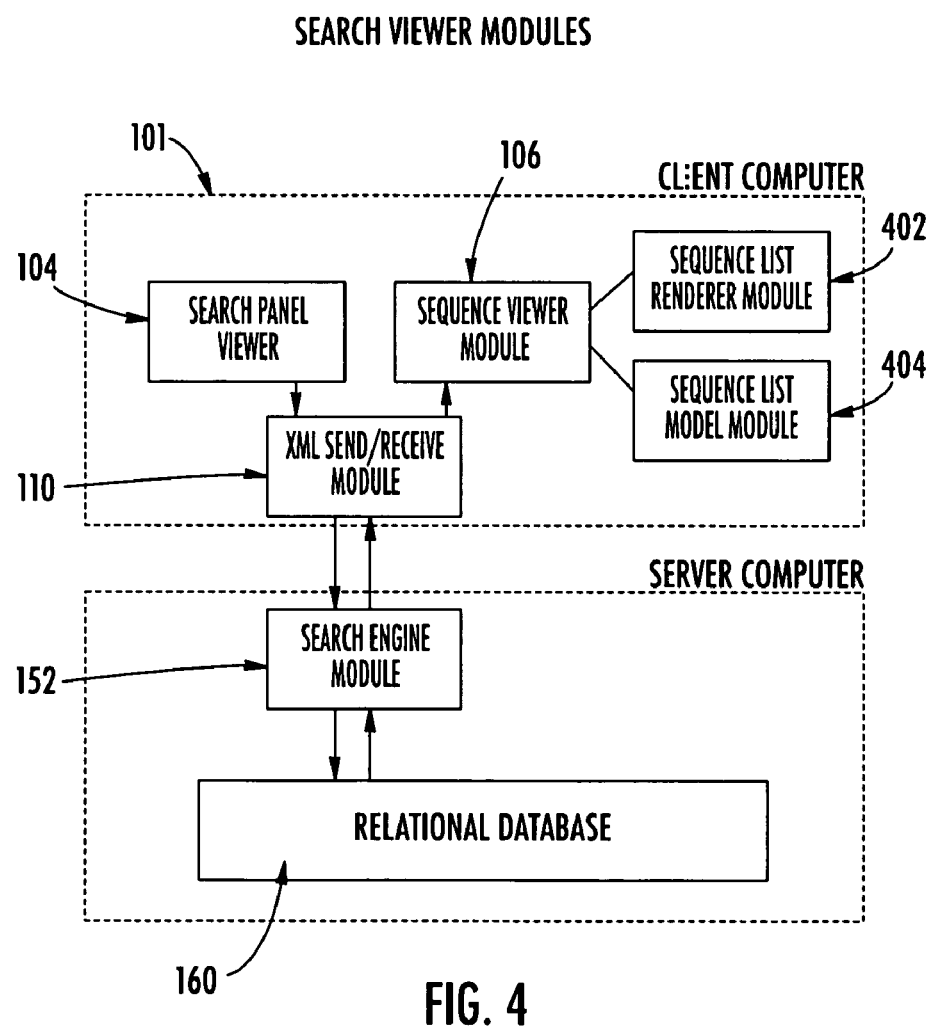
FIG. 4 illustrates the structural modules of the Search Panel Module in one embodiment of the invention.

Now in reference to FIG. 4, the Search Viewer Module 101 is more fully described. The Search Panel Module 104 presents a user with a GUI and provides selectable options for specifying a narrow search of the Relational Database 160. As described in reference to FIG. 1, the XML send/receive Module 110 receives a query string from the Search Panel Module 104, translates it into an XML statement, and sends it to the Search Engine Module 152. As will be described in more detail in a subsequent drawing, the Search Engine Module 152 utilizes other modules to conduct an efficient search of the Relational Database 160 and receives the SQL results. The Search Engine Module 152 translates the SQL results into an XML file and sends the XML results to the XML send/receive Module 110.

The XML send/receive Module 110 then formats and sends the XML results to the Sequence Viewer Module 106 for display to the user. The use of XML allows the results to be fed into numerous external applications by formatting a few parameters within the XML file itself. The results do not have to be reformatted for each external application; a tag with the proper information will allow the results to be read into an XML compatible application.

The Sequence Viewer Module 106 also comprises a Sequence List Renderer Module 402 and a Sequence List Model Module 404. The Sequence List Renderer Module 402 provides instructions to the Sequence Viewer Module 106 on how to format and display the graphical representation of a gene sequence to the user. The Sequence List Model Module 404 provides instructions to the Sequence Viewer Module 106 on how to display the list of gene sequences and their associated properties. In one embodiment, the Sequence Viewer Module displays the gene sequences using a standard model view of the gene.

The Search Viewer Module 101 may additionally contain other external applications that allow further manipulation of the search results. For example, applications may be provided for exporting the gene information in a specific format, such as FastA, or assemblies. Other additional modules may allow a user to electronically send gene information to another person, or may be responsible for comparing a returned gene with other known gene information. The location of modules relative to the Client and Server Computers in this FIG. 4 represents one embodiment of the present invention. Those of ordinary skill in the art will realize that a Relational Database 160 may be located on a remote Server Computer, while the remainder of the modules are located on a Client Computer as will be discussed in greater detail herein below.

Figure 5:
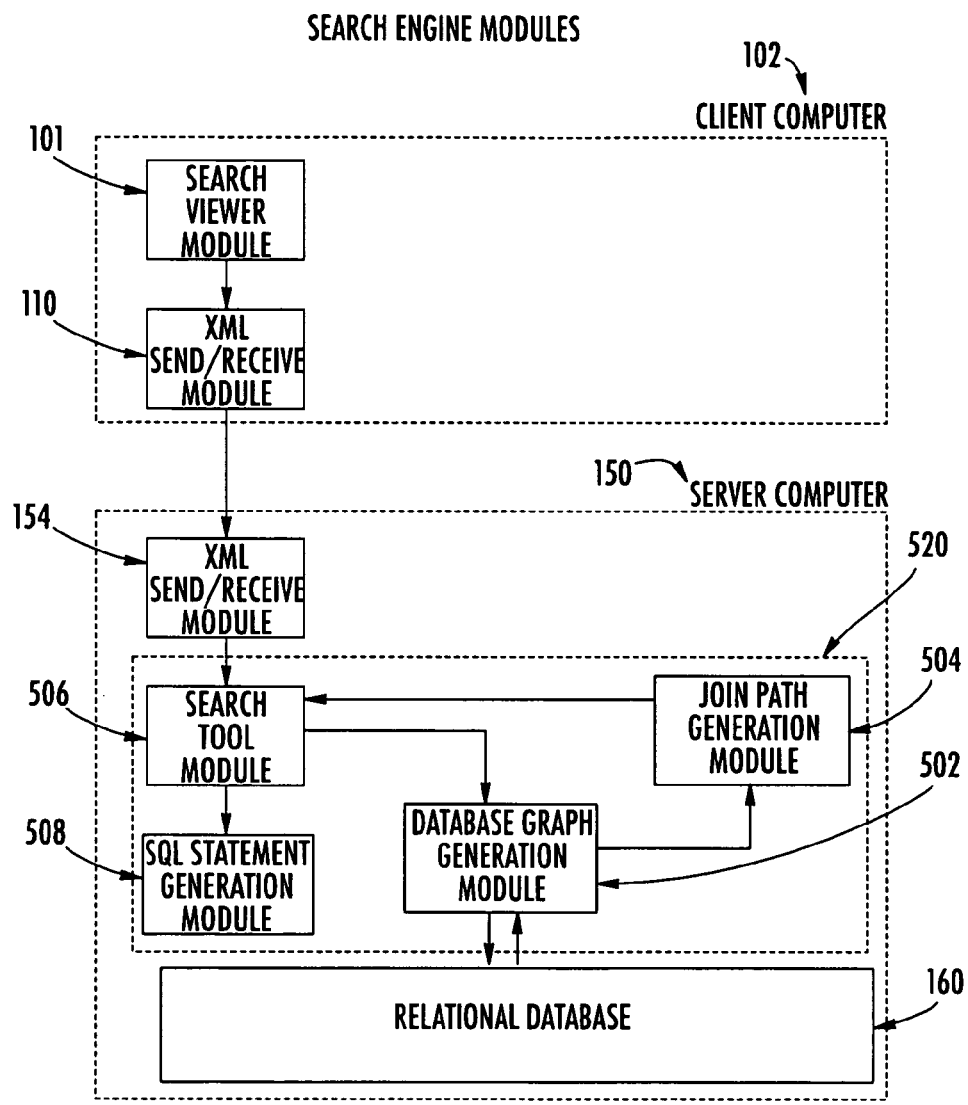
FIG. 5 illustrates the structural modules of the Search Engine Module in one embodiment of the invention.

Now referring to FIG. 5, the Search Engine 520 is more fully described and its modules depicted. The Search Engine 520 is stored on and executed by a Server Computer 150. An XML send/receive Module 154 receives an XML file from the XML Send/Receive Module 110 of the Client Computer 102 that includes the user-selected search criteria embedded within the appropriate XML tags. The XML search file is delivered to the Search Tool Module 506, which calls the Database Graph Generation Module 502. The Database Graph Generation Module 502 parses the Relational Database 160 and creates a database graph representing the specific database schema. In one embodiment, the database graph is created by performing a SELECT on a table that contains information about the database tables and their constraints. Accordingly, an XML file is created that describes the table and its constraints. This database graph is stored on the Server Computer 150 on which the relational database is stored. This database graph can be used in subsequent searches to more efficiently practice the present invention. The database graph is subsequently accessed by the Join Path Generation Module 504, which constructs the joins between the relevant tables, or nodes. The Join Path Generation Module 504 additionally calculates the shortest path between nodes based on the query parameters, as discussed previously.

The efficient joins between nodes are then communicated back to the Search Tool Module 506, which passes the information to the SQL Statement Generation Module 508. The SQL Statement Generation Module 508 then incorporates the correct joins to formulate a proper SQL statement that will result in an efficient search of the Relational Database 160. Thus, the objective of the Search Engine 520 is to formulate an SQL statement that represents the most efficient means for querying the database according to the user-specified search criteria. This specific embodiment describes the Search Engine 520 as being located on the Server Computer 150. While this is the preferred embodiment for searching a local database, it may not be possible to locate the Search Engine 520 on a Server Computer 150 that stores a publicly accessible, remotely-located database. That specific embodiment will be described in conjunction with the following Figure.

Figure 6:
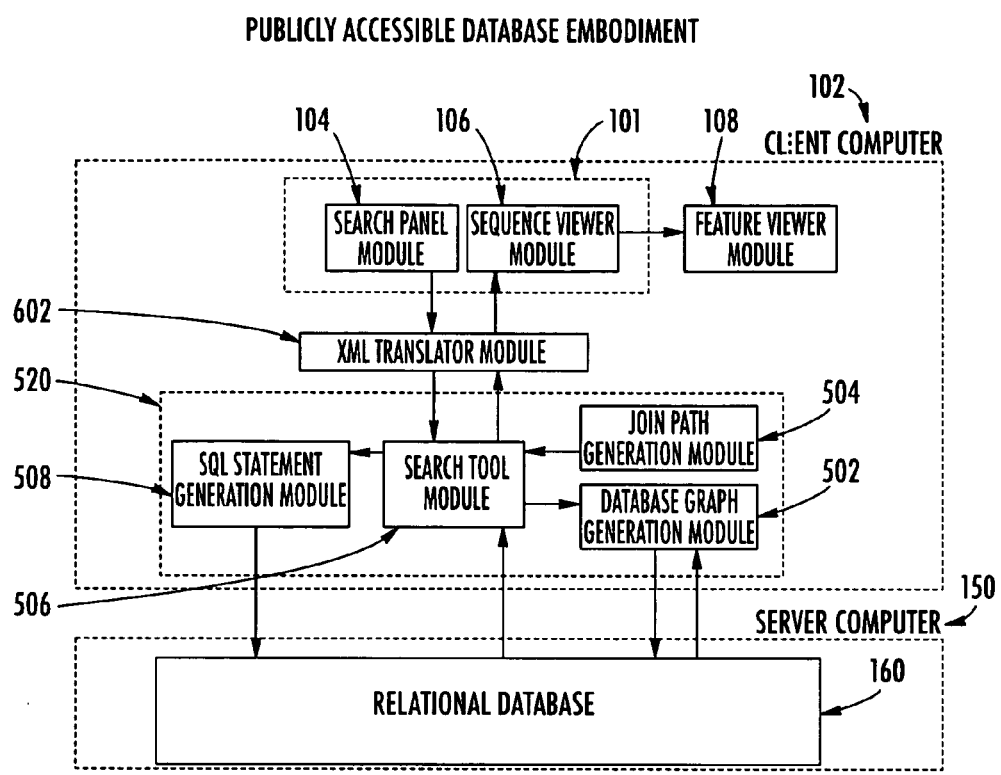
FIG. 6 illustrates one embodiment for searching a remotely located database.

FIG. 6 describes a system and method for searching any publicly accessible, remotely-located biological database. In one aspect, all the required modules are stored on a Client Computer 102. A Search Viewer Module 101 comprises a Search Panel Module 104 and a Sequence Viewer Module 106. A user selects a publicly accessible database in which to search as a parameter in the Search Panel Module 104 as has already been described herein. The user further selects other search criteria in the Search Panel Module 104 and then clicks a "Search" or similar button presented within the GUI of the Search Panel Module 104.

The query string passes through an XML Translator Module 602 and is translated into an XML formatted query and sent to the Search Engine 520. The Search Tool Module 506 receives the XML formatted query from the XML Translator Module 602, at which time, the Database Graph Generation Module 502 parses the database and creates a database graph representing the database schema. Based on the search criteria, the Join Path Generation Module 504 then constructs and optimizes the correct joins to effect an efficient search of the database. The results of the search are subsequently returned to the Search Tool Module 506.

The Search Tool Module 506 sends the XML query, along with the correct joins, to the SQL Statement Generation Module 508. The SQL Statement Generation Module 508 translates the XML query into an appropriate SQL query and incorporates the correct joins in order to efficiently search the Relational Database 160 for the requested information. The SQL query is sent to the Relational Database 160 as is generally known in the art. The Relational Database 160 returns the search results to the Search Tool Module 506, which forwards them directly to the XML Translator Module 602 to be converted back into an XML file. The XML Translator Module 602 translates the search results into XML and sends the resulting XML file to the Sequence Viewer Module 106 for representation to the user. The user can then view and manipulate the results, including invoking a Feature Viewer Module 108 to graphically represent the returned results.

This specific embodiment describes a method for searching a remotely located database. Searching a remote database in this manner is much slower than locating the Search Engine 520 on the Server Computer 150 along with the Relational Database 160. In this embodiment, the Database Graph Generation Module 502 must communicate and receive a substantial amount of information with the Relational Database 160 through a network system. The time required for this exchange is controlled by the available bandwidth, which will be much slower than if the Search Engine 520 were able to communicate with a Relational Database 160 stored on the same computer. Hence, locating the Search Engine 520 on the Server Computer 150 allows the Database Graph Generation Module 502 to perform its instructions much faster than if it had to communicate across a network protocol such as a TCP protocol.

Figure 7:
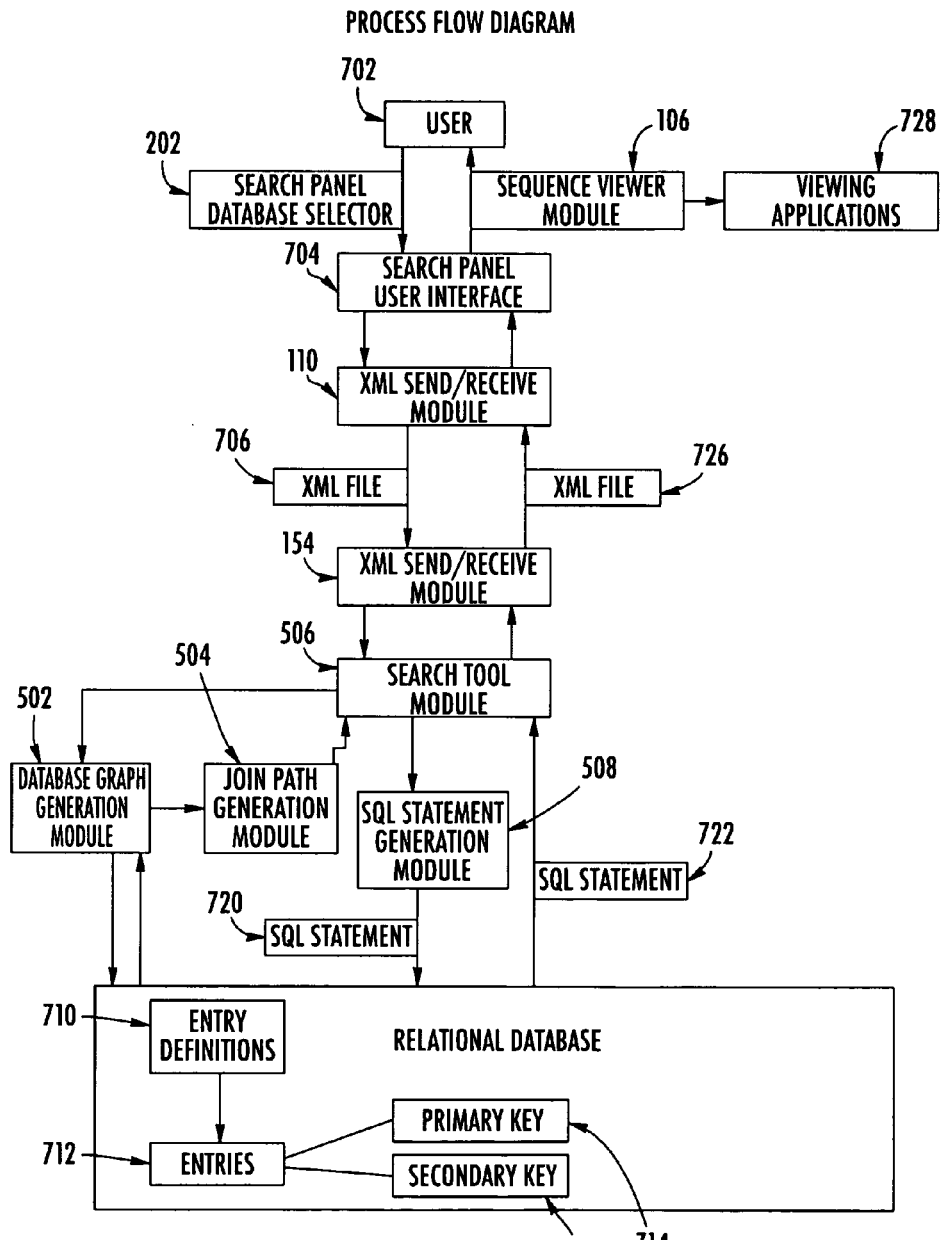
FIG. 7 is a process flow diagram depicting one method within an embodiment of the invention.

In reference to FIG. 7, a process flow diagram is depicted. A User 702 accessing a Client Computer utilizes the Search Panel Database Selector 202 field presented within the Search Panel User Interface 704 to choose a database stored on a Server Computer in which to search. Alternatively, a User 702 may specify a Server Computer or a folder stored on a Server Computer in which to conduct the search without specifying a specific database. This way, all databases contained within the specified folder or stored on the specified computer can be searched according to the search criteria, thus allowing a user to retrieve specific results without designating a particular database.

Once a search location is selected, the user specifies filtering criteria in the Search Panel User Interface 704 presented by the Search Panel Module. An XML File 706 containing the search criteria is created and sent to the Search Tool Module 506 of the Search Engine, which resides on a server computer. The Search Tool Module 506 instructs the Database Graph Generation Module 502 to create a database graph. This is done by parsing the database and accessing the Entry Definitions 710. The Entry Definitions 710 have associated Data Entries 712, which include at least one Primary Key 714 and may contain one or more Secondary Keys 716. The database graph is generated, representing the database schema, from which the Join Path Generation Module 504 is able to construct the correct joins between the database tables and then subsequently calculate the most efficient path between the requested nodes. The efficient path is communicated to the Search Tool Module 506, which then sends the appropriate query, including the requested nodes and the calculated joins between the nodes, to the SQL Statement Generation Module 508. The SQL Statement Generation Module 508 translates the query into an appropriate SQL Statement 720 and sends the query to the Relational Database 160, which is governed by database management software, and returns the requested information in a corresponding SQL Statement 722 to the Search Tool Module 506.

The Search Tool Module 506 sends the SQL results to an XML send/receive module 154 which translates the SQL results into an appropriate XML file 726. The XML send/receive module 154 then sends the XML Results File 726 to the Search Panel User Interface 704. The graphical results are displayed to the User 702 in the Sequence Viewer Module 106. The User 702 is then able to invoke an external Viewing Application 728 to further view and modify the returned results.

The foregoing description specifically describes one embodiment and method of practicing the current invention. The invention, however, is not limited to the embodiment described herein. It should be understood that changes may be made to the specific modules or information flow without departing from the scope of the invention, thus, the scope of the present invention is defined solely by the following claims.

What is claimed is:

1. A system for searching a relational database of biological information, said system comprising:
    a server computer comprising a relational database of biological information and a first module for receiving a structured language query and transferring said query to a search engine;
    a database graph generation module associated with said search engine configured to generate a database graph; and
    a joins module configured to create joins between relational database tables based on said database graph, wherein said server computer runs a structured query language (SQL) search on said relational database based upon said joins for obtaining search results for a user.

2. The system of claim 1, comprising a second module that receives the results of said SQL search and translates said search results into a structured language.

3. The system of claim 2, wherein said structured language query is sent to a client computer.

4. The system of claim 1, wherein said first module comprises a user interface that provides a list of searchable fields within said database.

5. The system of claim 1, wherein said first module comprises a viewer module configured to present search results in a graphical format.

6. The system of claim 2, wherein said structured language comprises the extensible markup language (XML), JavaScript, or the hypertext markup language (HTML).

7. A computer system search engine for searching a relational database of biological information, comprising:
    a relational database of biological information comprising tables of biological data;
    a search module configured to receive a structured language query and convert said structured language query into a search statement for querying said relational database of biological information; and
    a joins module configured to determine how to join said tables of biological data in order to provide the results of said query to a user.

8. The search engine of claim 7, further comprising an XML send/receive Module for sending and receiving information to and from a Search Panel Module stored on a Client Computer.

9. The search engine of claim 8, wherein said XML send/receive Module receives an XML structured query from said Client Computer, and delivers said XML structured query to a search tool module.

10. The search engine of claim 7, further comprising a Database Graph Generation Module which creates a graph of a user-selected database.

11. The search engine of claim 10, wherein said joins module is a Create Joins Module which utilizes said database graph to create joins between said database tables.

12. The search engine of claim 11, wherein said Create Joins Module calculates the shortest path between two database nodes thereby optimizing the retrieval of requested database data.

13. The search engine of claim 7, further comprising a SQL statement generation module for translating said XML structured query into an SQL statement and sending said SQL statement to said Relational Database.

14. A method for querying a relational database, comprising the steps of:
    sending a structured language database query to a search engine;
    parsing the relational database and creating a database graph;
    creating correct joins between nodes corresponding to said query;
    translating said structured language database query into an SQL statement incorporating said joins; and
    sending said SQL statement to said Relational Database for obtaining search results for a user.

15. The method of claim 14, including the further step of optimizing said joins by calculating the shortest path between the nodes specified in said query.

16. The method of claim 15, including the further steps of receiving requested results from said database, translating said results into said structured language and returning said results.

17. The method of claim 16, including the further step of displaying said search results.

18. The method of claim 16, wherein said structured language is the Extensible Markup Language.

19. A system for searching a relational database of biological information, said system comprising:
    a server computer comprising a relational database of biological information and a first module for receiving a structured language query and transferring said query to a search engine;
    a database graph generation module associated with said search engine configured to generate a database graph by parsing said relational database; and
    a joins module configured to create optimized joins between relational database tables by utilizing said database graph to calculate the shortest path between nodes specified in said query, wherein said server computer runs a structured query language (SQL) search on said relational database based upon said joins for obtaining search results for a user.

20. A computer system search engine for searching a relational database of biological information, comprising:
    a relational database of biological information comprising tables of biological data;
    a search module configured to receive a structured language query and convert said structured language query into a search statement for querying said relational database of biological information;
    a database graph generation module which creates a graph of said database; and
    a joins module configured to create optimized joins between said tables of biological data by utilizing said graph to calculate the shortest path between said tables specified in said query, said optimized joins being incorporated into said search statement by said search module for use in obtaining search results for a user.

21. A computer program product comprising computer-executable instructions embodied in a computer-readable storage medium for performing steps comprising:
    sending a structured language database query to a search engine;
    parsing a relational database and creating a database graph;
    creating correct joins between nodes corresponding to said query;
    translating said structured language database query into an SQL statement incorporating said correct joins; and
    sending said SQL statement to said relational database for obtaining search results for a user.

* * * * *